United States Patent
Lee et al.

(10) Patent No.: US 8,045,508 B2
(45) Date of Patent: Oct. 25, 2011

(54) RANK FEEDBACK METHOD FOR MULTIPLE-INPUT MULTIPLE-OUTPUT TRANSMISSION

(75) Inventors: Moon Il Lee, Gyeonggi-do (KR); Seung Hee Han, Gyeonggi-do (KR); Jae Hoon Chung, Gyeonggi-do (KR); Hyun Soo Ko, Gyeonggi-do (KR); Bin Chul Ihm, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 461 days.

(21) Appl. No.: 12/371,565

(22) Filed: Feb. 13, 2009

(65) Prior Publication Data

US 2009/0207784 A1    Aug. 20, 2009

Related U.S. Application Data

(60) Provisional application No. 61/028,575, filed on Feb. 14, 2008.

(30) Foreign Application Priority Data

Oct. 29, 2008  (KR) .................. 10-2008-0106301

(51) Int. Cl.
    *H04W 40/00*    (2009.01)
(52) U.S. Cl. ....................... 370/328; 370/329
(58) Field of Classification Search .......... 370/329, 370/208, 335, 210, 330; 455/506, 522
    See application file for complete search history.

(56) References Cited

U.S. PATENT DOCUMENTS

| | | | |
|---|---|---|---|
| 7,885,673 B2* | 2/2011 | Brunel et al. | 455/506 |
| 7,907,567 B2* | 3/2011 | Kim et al. | 370/329 |
| 7,929,415 B2* | 4/2011 | Kwak et al. | 370/208 |
| 7,969,943 B2* | 6/2011 | Miki et al. | 370/329 |
| 2003/0108013 A1* | 6/2003 | Hwang et al. | 370/335 |
| 2004/0116143 A1* | 6/2004 | Love et al. | 455/522 |
| 2008/0212464 A1* | 9/2008 | Kim et al. | 370/210 |
| 2009/0196249 A1* | 8/2009 | Kawamura et al. | 370/330 |
| 2009/0199055 A1* | 8/2009 | Chen et al. | 714/701 |
| 2009/0245190 A1* | 10/2009 | Higuchi et al. | 370/329 |

* cited by examiner

*Primary Examiner* — Thong Vu
(74) *Attorney, Agent, or Firm* — Lee, Hong, Degerman, Kang & Waimey

(57) ABSTRACT

A method for transmitting a plurality of control information through a PUCCH or a PUSCH is disclosed. The method includes transmitting first control information, and transmitting second control information. The transmission of the first control information and the transmission of the second control information are performed in units of one subframe and are performed once per predetermined period, respectively. In a subframe in which the transmission of the second control information is to be simultaneously performed with the transmission of the first control information, the second control information is excluded for transmission or the first and the second information are simultaneously transmitted, according to the configuration of a closed-loop system or an open-loop system.

6 Claims, 2 Drawing Sheets

| Reporting instance | RI | Wideband CQI/PMI | Wideband CQI/PMI | Wideband CQI/PMI | RI | Wideband CQI/PMI | Wideband CQI/PMI | Wideband CQI/PMI |
|---|---|---|---|---|---|---|---|---|
| | 0 | 1 | 2 | 3 | 4 | 5 | 6 | 7 |

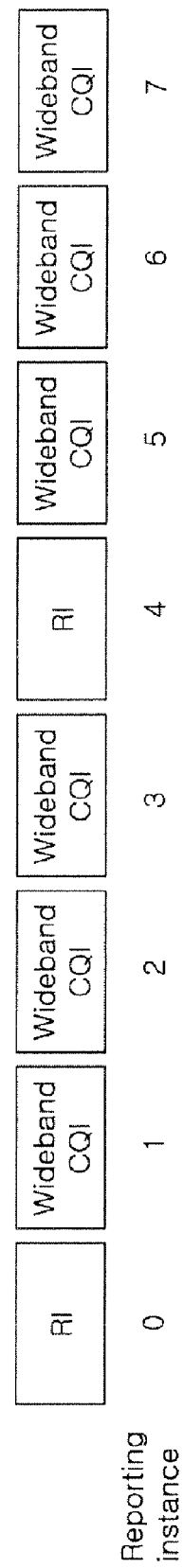

US 8,045,508 B2

RANK FEEDBACK METHOD FOR MULTIPLE-INPUT MULTIPLE-OUTPUT TRANSMISSION

CROSS-REFERENCE TO RELATED APPLICATIONS

This application claims the benefit of the Korean Patent Application No. 10-2008-0106301, filed on Oct. 29, 2008, which is hereby incorporated by reference as if fully set forth herein.

This application also claims the benefit of U.S. Provisional Application Ser. No. 61/028,575, filed on Feb. 14, 2008, the contents of which are hereby incorporated by reference herein in their entirety.

BACKGROUND OF THE INVENTION

1. Field of the Invention

The present invention relates to a wideband wireless mobile communication system using a plurality of antennas, and more particularly, to a method of processing control information on a physical channel.

2. Discussion of the Related Art

In next generation mobile communication and wireless transmission systems, an improved transmission rate and system capacity in a multi-cell environment have been demanded. To meet such a demand, studies on a multiple-input multiple-output (MIMO) system, which transmits data using multiple antennas, have been conducted. To improve the transmission rate of data in a multi-cell environment, a closed-loop MIMO system improves transmission capabilities using channel information.

In a MIMO system using a frequency division duplex (FDD) scheme, a user equipment (UE) can recognize information as to a reception channel using received data, whereas an eNode B (eNB) cannot know the channel information without feedback of specific channel information. Since the eNB can greatly improve system capabilities through adaptive channel transmission using the channel information of a downlink, the channel information needs to be fed back so that the eNB can recognize the channel information. When uplink/downlink in time division duplex (TDD) use the same frequency band, since frequency channel characteristics of uplink/downlink of the eNB and the UE are the same, the eNB cannot estimate the reception channel information of the UE in the case where a time-varying characteristic of a channel is not substantial.

In a closed-loop system using a MIMO scheme, general channel feedback information includes a channel quality indicator (CQI), a precoding matrix index (PMI), and rank information (RI).

Time and frequency resources, that can be used by a UE to report the CQI, PMI, and RI, may be controlled by an eNB. The above control information may be reported periodically or aperiodically. For spatial multiplexing, the UE may determine RI corresponding to the number of available transmission layers.

The UE may transmit CQI, PMI, and RI reporting on a physical uplink control channel (PUCCH) in subframes in which a physical uplink shared channel (PUSCH) is not allocated. The UE may transmit CQI, PMI, and RI reporting on the PUSCH in subframes with PUSCH allocation.

Meanwhile, data and control sequences transmitted from a media access control (MAC) layer to a physical layer are encoded and then provide transport and control services through a radio transmission link. A channel coding scheme is comprised of a combination of processes of error detection, error correction, rate matching, interleaving, and mapping of transport channel information or control information to a physical channel. The control information includes the CQI, PMI, and RI.

Control information, and data information from a transport channel may be multiplexed to generate a multiplexed sequence. The control information may be classified into one or more types according to properties thereof and various multiplexing schemes may be considered according to the number of classified types. If only one type of control information is present, when data information and control information are multiplexed, the control information may or may not overwrite the data information. If two types of control information are present, the control information is divided into a first type of control information and a second type of control information. If the second type of control information is more important than the first type of control information, data information and control information may be multiplexed in a manner that the first type of control information overwrites or does not overwrite the data information. Next, the second type of control information may or may not overwrite the multiplexed data information and/or the first type of control information.

SUMMARY OF THE INVENTION

The present invention provides a method for transmitting control information including at least one of PMI/CQI, RI, and acknowledgement/negative acknowledgement (ACK)/NAK through a PUSCH or a PUCCH using effective scheduling.

The object of the present invention can be achieved by providing a method for reporting a plurality of control information through a PUCCH in a wireless mobile communication system using a plurality of transmit antennas, the method including transmitting first control information, and transmitting second control information, wherein the transmission of the first control information and the transmission of the second control information are performed in units of one subframe and are performed once per predetermined period. The transmission of the second control information may be performed in subframes except for subframes in which the transmission of the first control information is performed. The first control information may be rank information (RI) and the second control information may be information as to a wideband channel quality indicator (CQI) and a wideband precoding matrix index (PMI) when a closed loop MIMO is used. When the wireless mobile communication system uses two transmit antennas, four bits may be allocated for transmission of the wideband CQI if a rank is 1, and seven bits may be allocated for transmission of the wideband CQI if a rank is greater than 1, and when the wireless mobile communication system uses four transmit antennas, four bits may be allocated for transmission of the wideband CQI if a rank is 1, and seven bits may be allocated for transmission of the wideband CQI if a rank is greater than 1. When the wireless mobile communication system uses two transmit antennas, two or three bits may be allocated for transmission of the wideband PMI if a rank is 1, and one or two bits may be allocated for transmission of the wideband PMI if a rank is 2, and when the wireless mobile communication system uses four transmit antennas, four bits may be allocated for transmission of the wideband PMI if a rank is 1, and four bits may be allocated for transmission of the wideband PMI if a rank is greater than 1. When the wireless mobile communication system uses two transmit antennas, one bit may be allocated for transmission of the RI, and when the wireless mobile communication system uses four transmit antennas, two bits may be allocated for transmission of the RI. The wireless mobile communication system may use a transmission mode of a closed-loop spatial multiplexing scheme.

The first control information may be RI and the second control information may be information as to a wireless CQI when an open-loop MIMO is used. Four bits may be allocated for transmission of the wideband CQI, one bit may be allocated for transmission of the RI when the wireless mobile communication system uses two transmit antennas, and two bits may be allocated for transmission of the RI when the wireless mobile communication system uses four transmit antennas. The wireless mobile communication system may use a transmission mode of an open-loop spatial multiplexing scheme.

In another aspect of the present invention, provided herein is a method for reporting a plurality of control information through a PUCCH in a wireless mobile communication system which uses a plurality of transmit antennas and a transmission mode of an open-loop spatial multiplexing scheme, the method including transmitting information as to a wideband CQI, and transmitting RI, wherein the transmission of the information as to the wideband CQI and the transmission of the RI are simultaneously performed in the same subframe, four bits are allocated for the transmission of the wideband CQI, one bit is allocated for the transmission of the RI when the wireless mobile communication system uses two transmit antennas, and two bits are allocated for the transmission of the RI when the wireless mobile communication system uses four transmit antennas.

According to the present invention, control information including at least one of PMI/CQI, RI, and ACK/NAK is transmitted through a PUSCH or a PUCCH using effective scheduling.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 2 is a view illustrating a transmission scheme for control information according to another exemplary embodiment of the present invention.

DETAILED DESCRIPTION OF THE INVENTION

Figure 1:
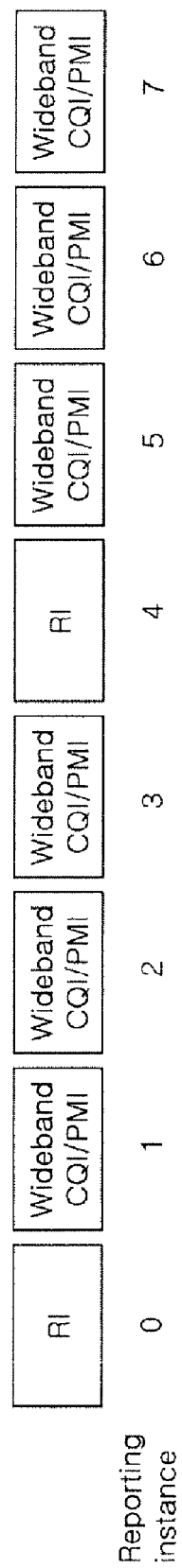
FIG. 1 is a view illustrating a transmission scheme for control information according to an exemplary embodiment of the present invention.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. Also, wherever possible, the same reference numbers will be used throughout the drawings to refer to the same or like parts.

The contents of 3GPP TS 36.211 is incorporated in this document by reference.

CQI/PMI/RI may be transmitted on a PUCCH or a PUSCH by the following methods which will be described hereinbelow.

Table 1 shows CQI transmission in various scheduling modes. The CQI may be transmitted on a PUCCH and PUSCH. When both periodic and aperiodic reporting is generated within the same subframe, a UE may transmit only the aperiodic report within that subframe.

TABLE 1

| Scheduling Mode | Periodic CQI reporting channels | Aperiodic CQI reporting channel |
| --- | --- | --- |
| Frequency non-selective | PUCCH | |
| Frequency selective | PUCCH | PUSCH |

When reporting RI, a UE may report a single instance indicating the number of useful transmission layers. For each RI reporting interval during closed-loop spatial multiplexing, the UE may determine RI from a supported set of RI values for eNB and UE antenna configurations and may report the number in each RI report. For each RI reporting interval during open-loop spatial multiplexing, the UE may determine RI for the eNB and UE antenna configuration in each reporting interval and report the detected number in each RI reporting interval to support selection between transmit diversity of RI=1 and large delay code division duplex (CDD) open-loop spatial multiplexing of RI>1.

When reporting PMI, a UE may report single or multiple PMI report. The UE may be limited to reporting PMI and RI only within a precoder codebook subset which is specified by a bitmap constructed by higher layer signaling. For a specific precoder codebook and related transmission mode, the bitmap can specify all possible precoder codebook subsets.

The set of subbands, 'S', evaluated by the UE for CQI reporting, may be defined within an entire downlink system bandwidth. A set of physical resource blocks (PRBs) constituting one subband may be comprised of k successive PRBs. Here, k may be semi-statically configured by a higher layer. The last subband in the set 'S' may have PRBs less in number than k according to $N_{RB}^{DL}$. The number of subbands for a system bandwidth given by $N_{RB}^{DL}$ may be defined by $N=\lceil N_{RB}^{DL}/k \rceil$.

For a single antenna port and transmit diversity as well as open-loop spatial multiplexing, and for closed-loop spatial multiplexing of RI=1, a single 4-bit wideband CQI may be reported according to the following Table 2. Here, 'wideband CQI' refers to a CQI value obtained over the set 'S'.

TABLE 2

| CQI index | Modulation | Coding rate × 1024 | Efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |

TABLE 2-continued

| CQI index | Modulation | Coding rate × 1024 | Efficiency |
|---|---|---|---|
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

When RI>1, reporting based on a closed-loop spatial multiplexing PUSCH may include reporting a wideband CQI which includes a 4-bit wideband CQI for a codeword 1 and a 4-bit wideband CQI for a codeword 2, according to Table 2.

When RI>1, reporting based on a closed-loop spatial multiplexing PUCCH may include separately reporting a 4-bit wideband CQI for a codeword 1 according to Table 2 and a wideband spatial differential CQI having a distinct reporting period and relative sub-frame offset. The wideband spatial differential CQI may include a 3-bit wideband spatial differential CQI for a codeword 2. The 3-bit wideband spatial differential CQI for a codeword 2 may be obtained by subtracting a wideband CQI index for a codeword 2 from a wideband CQI index for a codeword 1. A set comprised of exact offset levels is {−4, −3, −2, −1, 0, +1, +2, +3}.

Aperiodic CQI/PMI/RI Reporting Using PUSCH

Upon receiving an indication transmitted by a scheduling grant, a UE can perform aperiodic CQI/PMI/RI reporting using a PUSCH. The aperiodic CQI report size and message format may be given by radio resource control (RRC).

A minimum reporting interval for aperiodic reporting of CQI/PMI/RI may be one subframe. The size of a subband for CQI is the same for transmitter and receiver configurations irrespective of whether or not precoding is present.

The UE is semi-statically configured by a higher layer and can feed back CQI/PMI and corresponding RI on the same PUSCH using one of the reporting modes given in the following Table 3.

TABLE 3

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The UE can use transmission modes of a single-antenna port (port 0), transmit diversity, open-loop spatial multiplexing, closed-loop spatial multiplexing, multiple-user MIMO, closed-loop rank=1 preceding, and single-antenna port (port 5). In this case, Mode 2-0 and Mode 3-0 can be supported for the transmission mode of the single-antenna port, Mode 2-0 and Mode 3-0 can be supported for the transmission mode of the transmit diversity, and Mode 2-0 and Mode 3-0 can be supported for the transmission mode of the open-loop spatial multiplexing, and Mode 1-2, Mode 2-2, and Mode 3-1 can be supported for the transmission mode of the closed-loop spatial multiplexing.

Selection of PMI and calculation of CQI depend on an RI value selected by the UE for a corresponding reporting instance. RI report in a PUSCH reporting mode is effective only for CQI/PMI report in the PUSCH reporting mode.

Periodic CQI/PMI/RI Reporting Using PUCCH

The UE is semi-statically configured by a higher layer and can periodically feed back different CQI, PMI, and RI on a PUCCH using reporting modes given in the following Table 4.

TABLE 4

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

For a subband CQI selected by the UE, a CQI report within a certain subframe may describe channel quality in 'a specific part of a bandwidth' or 'specific parts of a bandwidth'. Hereinafter, 'a specific part of a bandwidth' or 'specific parts of a bandwidth' may be indicated by the terms 'a bandwidth part (BP)' or 'bandwidth parts'. Subbands may be assigned index numbers from the lowest frequency in order of increasing frequency, or may be assigned index number in order of not increasing frequency.

A total of N subbands are present in a system bandwidth of $N_{RB}^{DL}$. Here, $\lfloor N_{RB}^{DL}/k \rfloor$ subbands may have size k. If $\lceil N_{RB}^{DL}/k \rceil - \lfloor N_{RB}^{DL}/k \rfloor > 0$, then one of the subbands may have a size of $N_{RB}^{DL} - k \cdot \lfloor N_{RB}^{DL}/k \rfloor$.

A BP is frequency-consecutive and may be comprised of $N_J$ subbands. Here, J bandwidth parts span $N_{RB}^{DL}$ or 'S' given in the following Table 5. If J=1, then $N_J$ is $\lceil N_{RB}^{DL}/k/J \rceil$, and if J>1, then $N_J$ may be $\lceil N_{RB}^{DL}/k/J \rceil$ or $\lceil N_{RB}^{DL}/k/J \rceil - 1$.

CQI and PMI payload sizes of each PUCCH reporting mode may be given by the following Table 5.

TABLE 5

| System Bandwidth $N_{RB}^{DL}$ | Subband Size k (RBs) | Bandwidth Parts (J) |
|---|---|---|
| 6-7 | (wideband CQI only) | 1 |
| 8-10 | 4 | 1 |
| 11-26 | 4 | 2 |
| 27-64 | 6 | 3 |
| 65-110 | 8 | 4 |

Four CQI/PMI and RI reporting types with different periods and offsets may be supported for each PUCCH reporting mode as given in Table 6 below. In Table 6, Report Type 1 supports CQI feedback for subbands selected by a UE, Reporting Type 2 supports CQI and PMI feedback, Report Type 3 supports RI feedback, and Report Type 4 supports wideband CQI.

TABLE 6

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Subband CQI | RI = 1 | NA | 4 + L | NA | 4 + L |
| | | RI > 1 | NA | 7 + L | NA | 4 + L |
| 2 | Wideband CQI/PMI | 2 TX Antennas RI = 1 | | | NA | NA |
| | | 4 TX Antennas RI = 1 | 8 | 8 | NA | NA |
| | | 2 TX Antennas RI > 1 | | | NA | NA |
| | | 4 TX Antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 | NA | NA | 4 | 4 |

In the above-described methods, a probability of both RI and CQI/PMI being encoded on a PUCCH in the same subframe has not been considered. However, the following alternatives may be considered.

1) Periodic reporting of RI and CQI/PMI on the PUCCH. For RI and CQI/PMI, only different reporting periods may be supported, or both different reporting periods and the same reporting period may be supported.

2) Periodic reporting of CQI/PMI on a PUSCH and periodic reporting of RI on the PUCCH. In this case, RI and CQI/PMI have different reporting periods.

3) Periodic reporting of RI and CQI/PMI on the PUSCH.

4) Aperiodic reporting of RI and CQI/PMI on the PUSCH. Here, RI is separately encoded from CQI/PMI, and RI indicates how the CQI/PMI is decoded.

5) Periodic reporting of RI on the PUCCH and PUSCH to be used for CQI/PMI report.

Embodiment 1

In an embodiment of the present invention, RI report and CQI/PMI report have the following relationship.

1) RI and CQI/PMI may be aperiodically reported on the PUSCH.

2) RI and CQI/PMI may be reported always in the same subframe.

3) CQI/PMI may be calculated assuming simultaneously reported RI.

Embodiment 2

In another embodiment of the present invention, RI report and CQI/PMI report have the following relationship.

1) RI and CQI/PMI may be periodically reported on the PUSCH.

2) RI and CQI/PMI may be reported always in the same subframe, and therefore, may be reported at the same period.

3) CQI/PMI may be calculated assuming simultaneously reported RI.

Embodiment 3

In a further embodiment of the present invention, RI report and CQI/PMI report have the following relationship.

1) For each UE, an eNB may configure a single CQI reporting resource for both RI and wideband CQI/PMI.

2) A reporting instance is defined as a subframe in which reporting is performed.

3) RI and wideband CQI/PMI are not transmitted to the same reporting instance.

4) Only RI is reported instead of wideband CQI/PMI every M-th CQI reporting instance according to the configuration of a higher layer.

5) Wideband CQI/PMI is reported in the other CQI reporting instances.

6) The most recently transmitted RI is used by a UE to calculate wideband CQI/PMI transmitted on a configured resource.

7) When CQI/PMI report or RI report is not multiplexed with ACK/NAK, Format 2 defined in section 5.4.2 of 3GPP TS 36.211 is used. When CQI/PMI report or RI report is multiplexed with ACK/NAK, Format 2a/2b defined in section 5.4.2 of 3GPP TS 36.211 is used.

FIG. 1 illustrates a reporting instance for M=4 in terms of the above-mentioned fourth relationship 4).

A payload size for a few scenarios may be defined as shown in Table 7 and Table 8.

Table 7 shows payload sizes for CQI and PMI, expressed by the number of bits, in a closed-loop spatial multiplexing scheme. In this case, the CQI/PMI is transmitted through the PUCCH.

TABLE 7

| | 2-Tx | | 4-Tx | |
|---|---|---|---|---|
| Field | Rank = 1 | Rank = 2 | Rank = 1 | Rank > 1 |
| Wideband CQI | 4 | 7 | 4 | 7 |
| Wideband PMI | [2 or 3] | [1 or 2] | 4 | 4 |

Table 8 shows a payload size for RI, expressed by the number of bits, in a closed-loop spatial multiplexing scheme. In this case, RI is transmitted through the PUCCH.

TABLE 8

| Field | 2-Tx | 4-Tx |
|---|---|---|
| RI | 1 | 2 |

Embodiment 4

In another embodiment of the present invention, frequency-selective CQI/PMI and RI report may be performed on the PUCCH in a similar way to the above-described methods. In this case, a relationship between wideband CQI/PMI, frequency-selective CQI/PMI report, and RI needs to be determined in detail according to a reporting method for frequency-selective CQI/PMI report for single user (SU)-MIMO.

Embodiment 5

The methods according to the above-described embodiments may also be applied to open-loop spatial multiplexing under the assumption of the following exception. Namely, PMI is not reported, and payload sizes for different scenarios on the PUCCH can be given by the following Table 9 and Table 10.

Table 9 shows a payload size for CQI, expressed by the number of bits, in an open-loop spatial multiplexing scheme. The CQI is transmitted through the PUCCH.

TABLE 9

| Field | 2-Tx | | 4-Tx | |
|---|---|---|---|---|
| | Rank = 1 | Rank = 2 | Rank = 1 | Rank > 1 |
| Wideband CQI | 4 | 4 | 4 | 4 |
| Wideband PMI | — | — | — | — |

Table 10 shows a payload size for RI, expressed by the number of bits, in an open-loop spatial multiplexing scheme. In this case, the RI is transmitted through a PUCCH.

TABLE 10

| Field | 2-Tx | 4-Tx |
|---|---|---|
| RI | 1 | 2 |

FIG. 2 illustrates application of the reporting method of FIG. 1 to the open-loop spatial multiplexing scheme. Since PMI is not transmitted on an uplink channel in the open-loop spatial multiplexing scheme, it can be appreciated that the PMI is not transmitted.

Alternatively, the methods according to the above-described embodiments may be applied to the open-loop spatial multiplexing scheme under the assumption of the following exception. That is, the PMI is not reported, CQI and RI are simultaneously reported, and payload sizes for different scenarios for a PUCCH can be given by the following Table 11.

Table 11 shows a payload size for CQI and PMI in an open-loop spatial multiplexing scheme. In this case, the CQI and PMI are transmitted through a PUCCH.

TABLE 11

| Field | 2-Tx | | 4-Tx | |
|---|---|---|---|---|
| | Rank = 1 | Rank = 2 | Rank = 1 | Rank > 1 |
| Wideband CQI | 4 | 4 | 4 | 4 |
| Wideband PMI | — | — | — | — |
| RI | 1 | | 2 | |

According to the above-described method for the open-loop spatial multiplexing transmission mode, since CQI and RI are transmitted on the PUCCH in the same subframe, a timing relationship is simplified.

In Embodiment 1, Embodiment 2, and Embodiment 4, RI may be transmitted by the following method.

When both RI and CQI/PMI are transmitted, the RI may be encoded separately from the CQI/PMI. Encoded bits or encoded sequences in which both the CQI and the PMI are encoded may be referred to as 'CQI/PMI codes'. The CQI/PMI codes are modulated to generate 'CQI/PMI symbols'. Similarly, encoded bits or encoded sequences in which the RI is encoded may be referred to as 'RI codes'. The RI codes are modulated to generate 'RI symbols'.

When both the RI codes and the CQI/PMI codes are transmitted, the RI codes are multiplexed and then transmitted by puncturing the CQI/PMI codes.

When the CQI/PMI codes are punctured, a puncturing pattern may be previously set so as to optimally maintain the Hamming distance/minimum distance/Euclidean distance of the CQI/PMI codes, in order to reduce deterioration of reception performance of CQI/PMI. Next, the CQI/PMI codes may be punctured by the necessary number of RI codes according to such a pattern rule.

In case of (32,10) Reed-Muller codes for example, if a varied Reed-Muller code set configured by a code sequence length M and information length N (variance of N is specified in table or by equation) for CQI and PMI encoding is used, RI codes can be multiplexed by puncturing CQI/PMI codes, through puncturing, repetition, and permutation between code indexes on a code length and a code set or code element indexes. Such multiplexing may use a puncturing method to reduce the length of code sequences from 32 to M (that is, a method of maximizing the distance or minimum distance of code sequences), a permutation method, or other methods.

When CQI/PMI is tail biting convolutional (TBC) encoded, CQI/PMI encoded sequences are punctured during rate matching for transmission of RI code sequences.

Meanwhile, additional encoding may be performed for RI in order to reduce a communication error. If the deterioration of reception performance according to the speed of a UE is not greatly considered, when RI is multiplexed with CQI/PMI and/or ACK/NAK and transmitted through a PUSCH, the multiplexed symbol sequences can be mapped to time/frequency (SC-FDMA symbol or OFDM symbol/subcarrier or subcarrier group) resources of a PUSCH by a time-first scheme (Method 1). However, when accurate channel estimation is needed according to the speed of the UE, RI and/or CQI/PMI symbol can be mapped adjacent to symbols before or after a reference signal (pilot) (Method 2).

Method 1 and Method 2 may combine sequential mapping from a start part of a PUSCH resource region by a time-first scheme (Option 1) or reverse mapping from an end part of the resource region (Option 2).

In this case, RI symbol sequences may be mapped with priority over CQI/PMI symbol sequences. In this way, RI can be easily decoded without error.

Conversely, the CQI/PMI symbol sequences may be mapped with priority over the RI symbol sequences.

When mapping the RI and ACK/NAK symbols to symbols adjacent to the right and left of a reference signal by Method 1, a mapping order is as follows. If CQI/PMI is mapped by the order of the above Option 1, then RI and ACK/NAK symbols can be mapped by the order of Option 2. Alternatively, if CQI/PMI is mapped by the order of Option 2, then the RI and ACK/NAK symbols may be mapped by the order of Option 1. Namely, if CQI/PMI is mapped using Option 1, then ACK/

NAK and RI are sequentially mapped from the last frequency subcarrier index on an available resource block (Option 1-A), and if CQI/PMI is mapped using Option 2, then ACK/NAK and RI may be sequentially mapped from the first frequency subcarrier index on an available resource block (Option 2-A).

In Option 1-A and Option 2-A, if RI is important, RI may be mapped first and ACK/NAK may be mapped to resource elements to which the RI is not mapped. Conversely, if ACK/NAK is important, ACK/NAK may be mapped first and RI may be mapped to resource elements to which the ACK/NAK is not mapped.

Alternatively, ACK/NAK and RI may be alternately mapped. In this case, ACK/NAK and RI may alternate in units of one modulation symbol or in units of a group consisting of a plurality of modulation symbols.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit may be located within or separately from the processor to transmit data to and receive data from the processor via various known means.

Various embodiments have been described in the best mode for carrying out the invention.

The present invention is applicable to communication equipment, user equipment, etc. used in a wideband wireless mobile communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for reporting a plurality of control information in a wireless mobile communication system using a plurality of transmit antennas, the method comprising:
    transmitting first control information; and transmitting second control information, wherein the transmission of the first control information and the transmission of the second control information are performed in units of one subframe and are performed once per predetermined period, respectively, and both of the first control information and the second control information is transmitted through a physical uplink control channel (PUCCH),
    wherein, when the wireless mobile communication system operates in a closed-loop spatial multiplexing mode, the first control information is rank information (RI), and the second control information is information as to a wideband channel quality indicator (CQI) and a wideband precoding matrix index (PMI),
    wherein, when the wireless mobile communication system uses two transmit antennas, four bits are allocated for transmission of the wideband CQI if a rank is 1, and seven bits are allocated for transmission of the wideband CQI if a rank is greater than 1, and wherein, when the wireless mobile communication system uses four transmit antennas, four bits are allocated for transmission of the wideband CQI if a rank is 1, and seven bits are allocated for transmission of the wideband CQI if a rank is greater than 1.

2. The method according to claim 1, wherein, when the wireless mobile communication system uses two transmit antennas, two or three bits are allocated for transmission of the wideband PMI if a rank is 1, and one or two bits are allocated for transmission of the wideband PMI if a rank is 2, and
    wherein, when the wireless mobile communication system uses four transmit antennas, four bits are allocated for transmission of the wideband PMI.

3. The method according to claim 1, wherein one bit is allocated for transmission of the RI when the wireless mobile communication system uses two transmit antennas, and two bits are allocated for transmission of the RI when the wireless mobile communication system uses four transmit antennas.

4. The method according to claim 1, wherein, when the wireless mobile communication system operates in a open-loop spatial multiplexing mode, the first control information is rank information (RI) and the second control information is information as to a wireless channel quality indicator (CQI).

5. The method according to claim 4, wherein four bits are allocated for transmission of the wideband CQI, one bit is allocated for transmission of the RI when the wireless mobile communication system uses two transmit antennas, and two bits are allocated for transmission of the RI when the wireless mobile communication system uses four transmit antennas.

6. A method for reporting a plurality of control information through a physical uplink control channel (PUCCH) in a wireless mobile communication system which uses a plurality of transmit antennas and a transmission mode of an open-loop spatial multiplexing scheme, the method comprising:
    transmitting information as to a wideband channel quality indicator (CQI); and transmitting rank information (RI),
    wherein the transmission of the information as to the wideband CQI and the transmission of the RI are simultaneously performed in the same subframe, four bits are allocated for the transmission of the wideband CQI, one bit is allocated for the transmission of the RI when the wireless mobile communication system uses two transmit antennas, and two bits are allocated for the transmission of the RI when the wireless mobile communication system uses four transmit antennas.

* * * * *